(12) United States Patent
Joncour

(10) Patent No.: US 11,084,572 B2
(45) Date of Patent: Aug. 10, 2021

(54) ELECTROMECHANICAL ACTUATOR FOR A MOVABLE FLIGHT SURFACE

(71) Applicant: SAFRAN ELECTRONICS & DEFENSE, Boulogne Billancourt (FR)

(72) Inventor: Yvon Joncour, Boulogne Billancourt (FR)

(73) Assignee: Safran Electronics & Defense, Boulogne-Billancourt (FR)

( * ) Notice: Subject to any disclaimer, the term of this patent is extended or adjusted under 35 U.S.C. 154(b) by 0 days.

(21) Appl. No.: 16/473,196

(22) PCT Filed: Dec. 13, 2017

(86) PCT No.: PCT/EP2017/082710
§ 371 (c)(1),
(2) Date: Jun. 24, 2019

(87) PCT Pub. No.: WO2018/114545
PCT Pub. Date: Jun. 28, 2018

(65) Prior Publication Data
US 2020/0086976 A1    Mar. 19, 2020

(30) Foreign Application Priority Data
Dec. 23, 2016 (FR) ..................... 16 63333

(51) Int. Cl.
*B64C 13/50*    (2006.01)
*B64C 9/08*    (2006.01)

(52) U.S. Cl.
CPC ............... *B64C 13/50* (2013.01); *B64C 9/08* (2013.01)

(58) Field of Classification Search
CPC .. B64C 13/50; B64C 9/08; B64C 9/10; B64C 9/30; B64C 13/12; B64C 13/504; B64C 2009/005
USPC ........................................ 244/201
See application file for complete search history.

(56) References Cited

U.S. PATENT DOCUMENTS

| 4,800,798 | A | * | 1/1989 | Boldrin | ............... F15B 18/00 244/227 |
| 5,515,282 | A | * | 5/1996 | Jackson | ............... G05D 1/0077 700/4 |
| 5,670,856 | A | * | 9/1997 | Le | ............... G05D 1/0077 244/194 |
| 5,806,808 | A | * | 9/1998 | O'Neil | ............... B64C 21/025 244/213 |
| 6,386,485 | B1 | * | 5/2002 | Sjoquist | ............... B64C 13/50 244/194 |

(Continued)

FOREIGN PATENT DOCUMENTS

| CA | 2977789 A1 * | 4/2018 | ......... H02P 29/0241 |
| CA | 3010063 A1 * | 4/2019 | ............ B64C 13/50 |

(Continued)

*Primary Examiner* — Christopher P Ellis
(74) *Attorney, Agent, or Firm* — Muncy, Geissler, Olds & Lowe, P.C.

(57) ABSTRACT

An electromechanical device for actuating a movable flight control surface having a skin hinged to a structure of an aircraft about a pivot axis, the device including: at least two electric motors for causing the skin to pivot about the pivot axis; a power circuit and a control circuit for powering and controlling each of the motors; and a device for limiting opposing forces exerted by the two electric motors.

7 Claims, 5 Drawing Sheets

(56) References Cited

U.S. PATENT DOCUMENTS

| | | | |
|---|---|---|---|
| 6,588,709 B1* | 7/2003 | Dunne | F02C 7/042 244/201 |
| 6,705,570 B1 | 3/2004 | Degenholtz et al. | |
| 8,583,293 B2* | 11/2013 | Soronda | B64C 13/503 701/3 |
| 8,820,174 B2* | 9/2014 | Carbone | G01L 1/04 73/783 |
| 2006/0113933 A1* | 6/2006 | Blanding | H02K 7/108 318/116 |
| 2007/0145180 A1* | 6/2007 | Johnson | B64C 13/50 244/13 |
| 2010/0038478 A1* | 2/2010 | Knight | F16H 49/001 244/102 R |
| 2010/0127132 A1* | 5/2010 | Kirkland | B64C 13/503 244/76 R |
| 2014/0163783 A1* | 6/2014 | Pierre | B64C 13/18 701/11 |
| 2016/0028332 A1* | 1/2016 | Fattal | H02P 5/68 244/213 |
| 2017/0283040 A1* | 10/2017 | Judey | B64C 13/503 |
| 2018/0015998 A1* | 1/2018 | Robillard | B64C 9/06 |
| 2018/0099739 A1* | 4/2018 | Salesse-Lavergne | B64C 13/04 |
| 2019/0061531 A1* | 2/2019 | Harrington | B60L 7/18 |
| 2019/0127049 A1* | 5/2019 | Blanding | B64C 13/40 |
| 2019/0308719 A1* | 10/2019 | Huynh | B64C 13/505 |

FOREIGN PATENT DOCUMENTS

| | | | |
|---|---|---|---|
| DE | 35 22 392 A1 | 1/1987 | |
| DE | 10 2011 114 222 A1 | 5/2013 | |
| EP | 1793477 A1 * | 6/2007 | B62D 5/0451 |
| EP | 2 927 113 A1 | 10/2015 | |
| EP | 3032725 A1 * | 6/2016 | H02K 41/06 |
| GB | 2498208 A * | 7/2013 | F16H 25/14 |
| WO | WO 2011/157834 A2 | 12/2011 | |
| WO | 2015/189424 A1 | 12/2015 | |
| WO | WO-2017182593 A1 * | 10/2017 | B64D 45/00 |

\* cited by examiner

ELECTROMECHANICAL ACTUATOR FOR A MOVABLE FLIGHT SURFACE

The present invention relates to movable flight control surfaces of aircraft, and to actuating them.

STATE OF THE ART

An aircraft, e.g. an airplane, generally has a main structure (the fuselage, the wings, the tail unit) and movable flight control surfaces (ailerons, spoilers, elevators, rudders, . . . ) hinged to that structure in order to be capable of being controlled in position so as to enable the aircraft to be controlled. The movable surface comprises a rigid structure carrying a covering to define the skin of the movable surface. Each movable flight control surface is moved into the desired position by means of one or more actuators, each comprising a fixed portion mounted in the structure of the aircraft and a movable portion connected to the movable flight control surface.

It is becoming more and more frequent for aircraft to make use of electrical actuators arranged to produce mechanical work when they are powered electrically. Such an actuator comprises an electromechanical device for producing force, a power circuit electrically powering the electromechanical device for producing force, and a control circuit that controls the power circuit and that is for connection to a flight computer of the aircraft. The flight computer receives information from control instruments handled by the pilot and from various sensors distributed over the aircraft, and on the basis of that information it produces instruction signals that are sent to the control circuit of each actuator.

The electromechanical device for producing force, the power circuit, and the control circuit are all three received in a housing provided in the main structure of the aircraft.

In certain applications, it would be preferable to use two electric motors for moving the same movable surface. Unfortunately, it is found that electromechanically actuating a movable surface by means of two electric motors can give rise to stresses on the movable surface that do not exist when actuation is performed by two hydraulic actuators.

OBJECT OF THE INVENTION

An object of the invention is to provide means for improving the actuation of movable flight control surfaces in an aircraft.

BRIEF SUMMARY OF THE INVENTION

To this end, the invention provides an electromechanical device for actuating a movable flight control surface having a skin hinged to a structure of an aircraft about a pivot axis, the device comprising:
  at least two electric motors for causing the skin to pivot about the pivot axis;
  a power circuit and a control circuit for powering and controlling each of the motors; and
  a device for limiting opposing forces exerted by means of the electric motors.

In an advantageous embodiment, the device for limiting opposing forces comprises a detector circuit arranged to determine the amplitude and the direction of a resultant of opposing forces so as to enable the motor control circuits to take correcting action as a function of the resultant.

The motors can thus be controlled so as to reduce the resultant.

Preferably, the detector circuit is connected to strain gauges that are fastened on a plate on which the stators of the motors are fastened; or the strain gauges are fastened on a bar connecting the rotors of the motors together in rotation.

Other characteristics and advantages of the invention appear on reading the following description of particular, non-limiting embodiments of the invention.

BRIEF DESCRIPTION OF THE FIGURES

Reference is made to the accompanying drawings, in which.

DETAILED DESCRIPTION OF THE INVENTION

Figure 1:
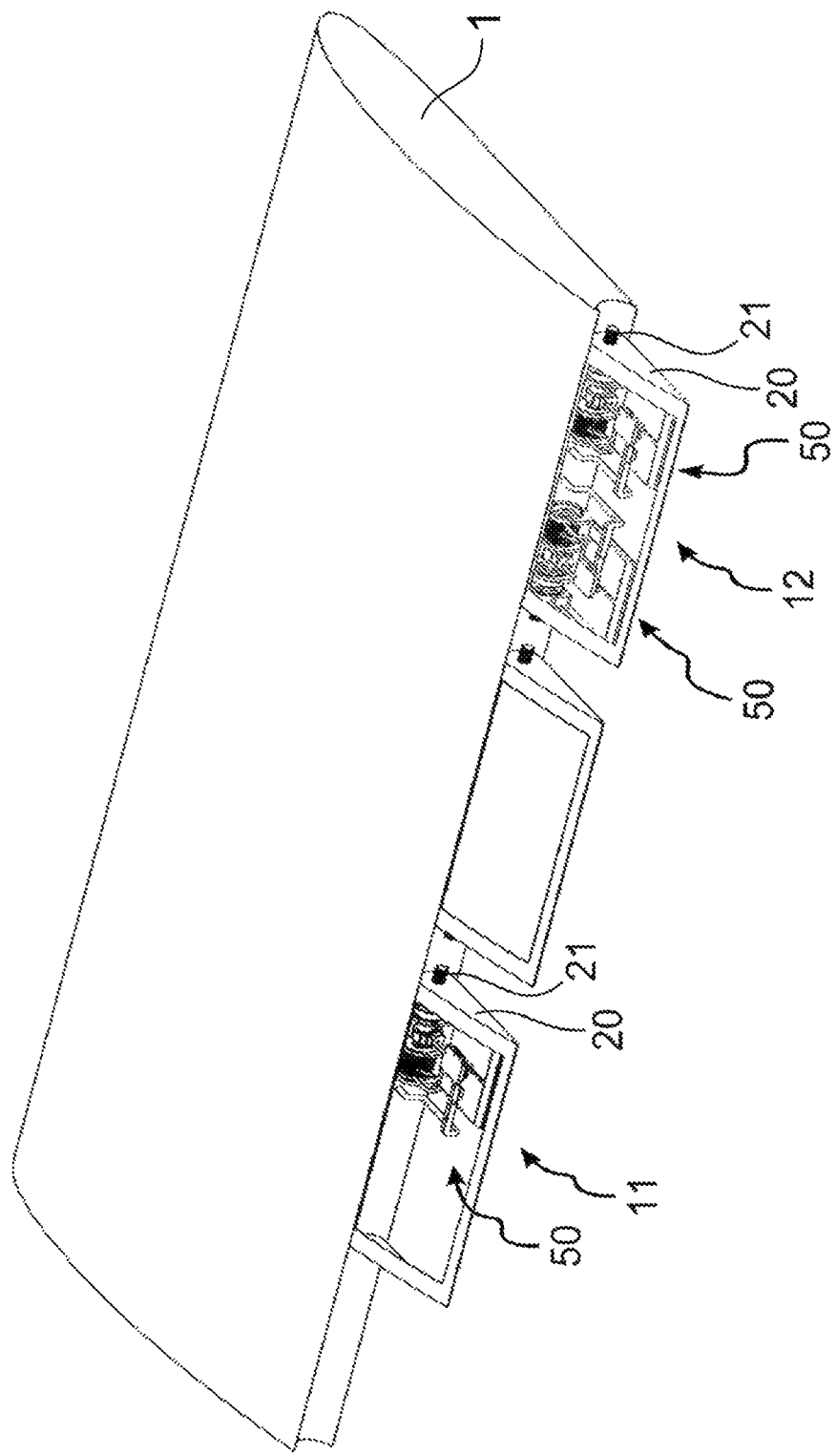
FIG. 1 is a partially cutaway fragmentary perspective view of a wing having movable flight control surfaces in accordance with the invention.
Figure 2:
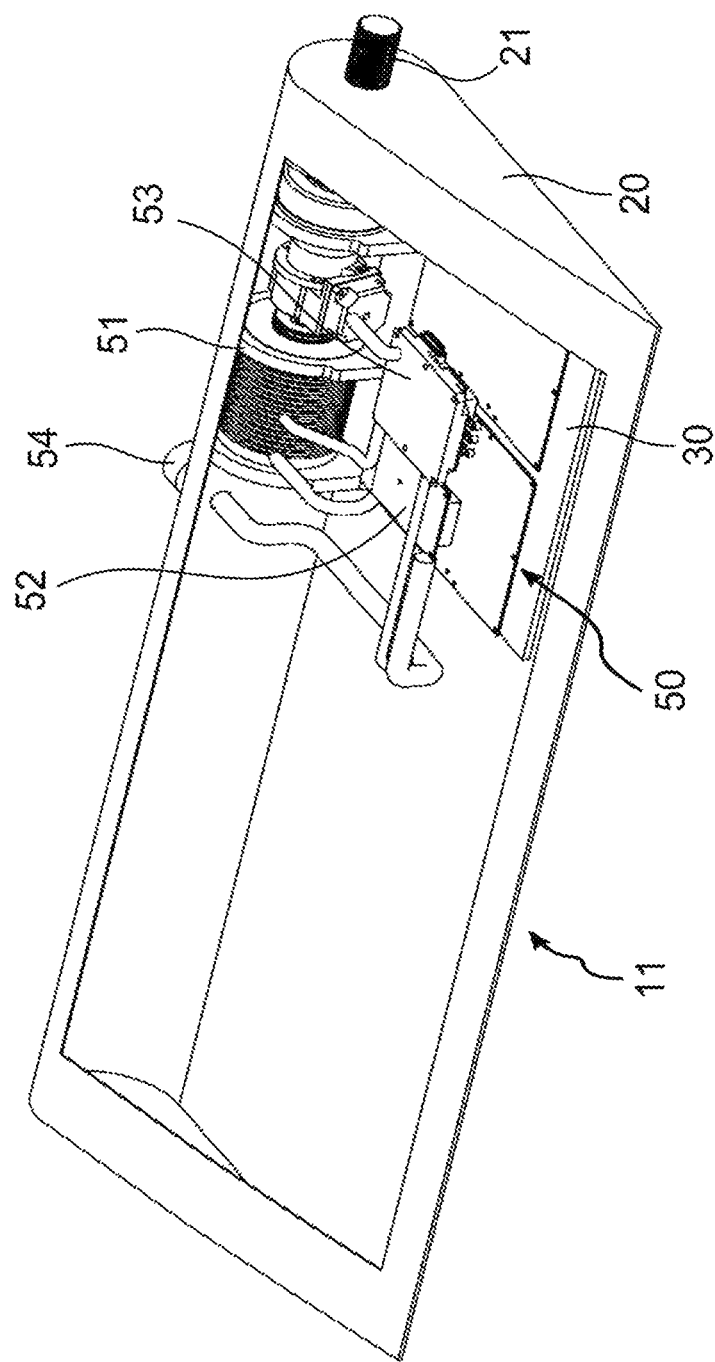
FIG. 2 is a cutaway diagrammatic perspective view showing a first of these flight control surfaces.
Figure 3:
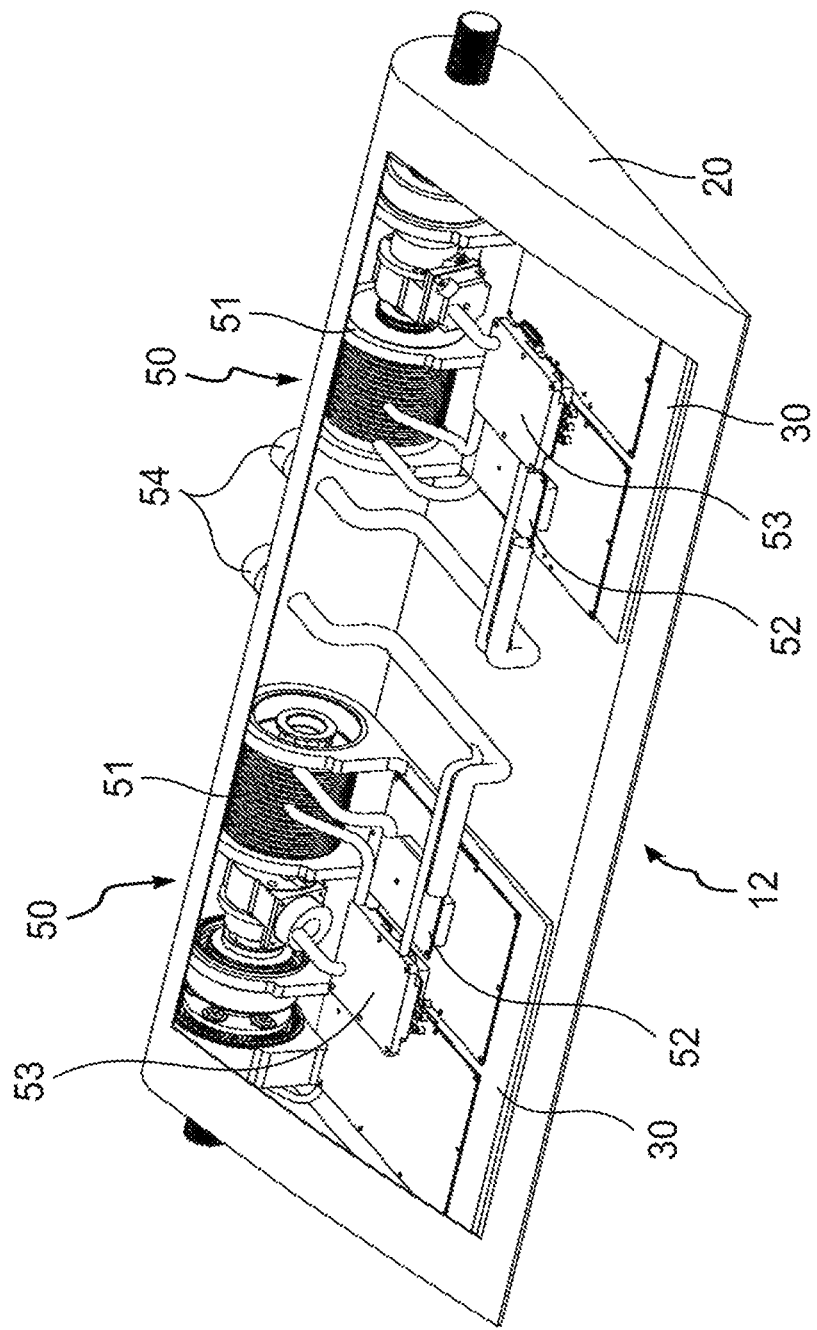
FIG. 3 is a cutaway diagrammatic perspective view showing a second of these flight control surfaces.
Figure 4:
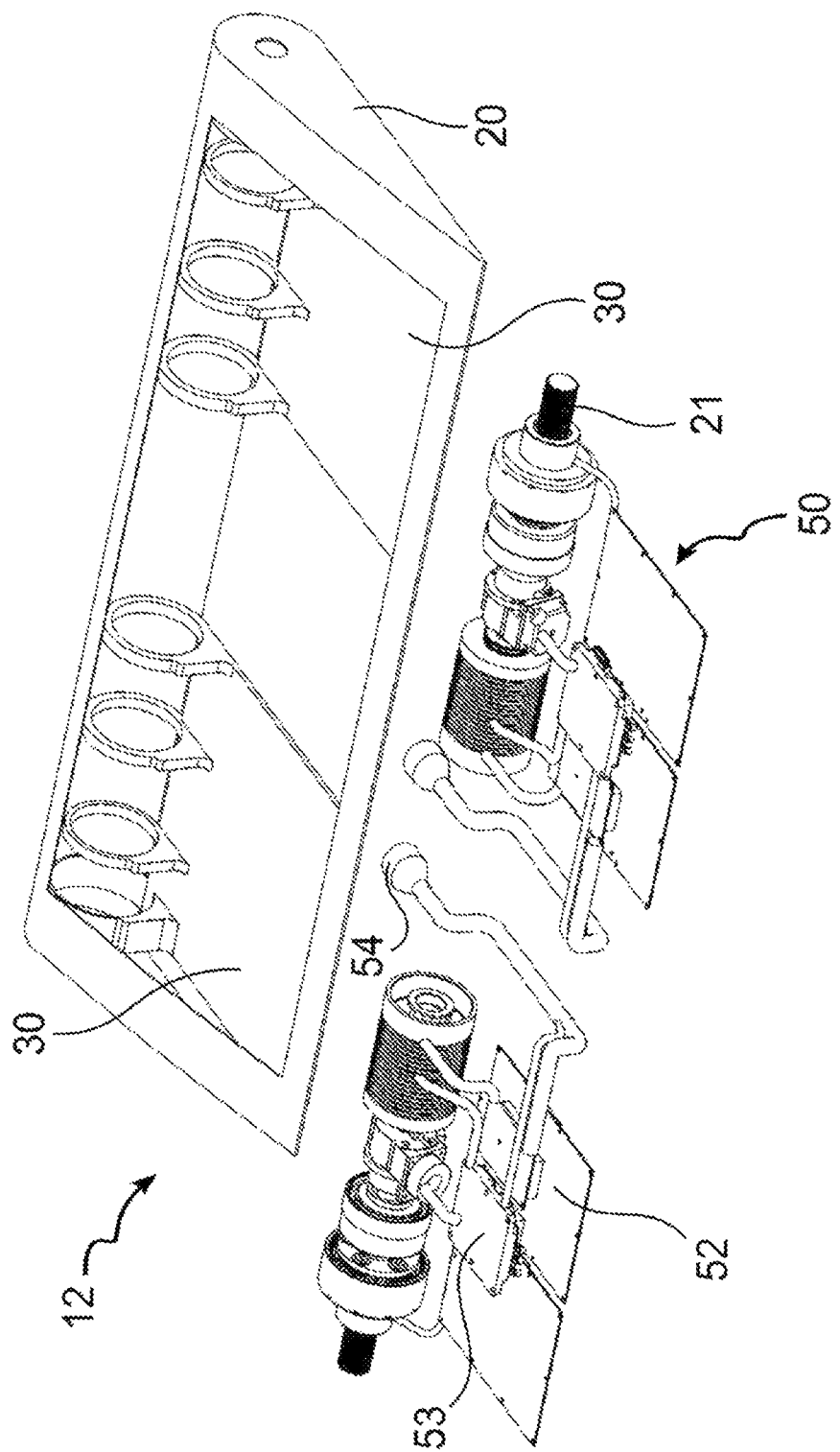
FIG. 4 is an exploded diagrammatic perspective view showing the second movable flight control surface.

With reference to the figures, the movable flight control surfaces of the invention in this example are ailerons, given general references 11 and 12, and that are hinged to the wings 1 of an airplane. Naturally, the invention is applicable to other types of movable flight control surface of an aircraft, and for example to spoilers, to elevators, to rudders, . . . .

Each aileron 11, 12 comprises a skin 20 mounted to pivot about a hinge axis 21 embodied in this example by two separate colinear shaft segments extending inside the skin 20 and having ends that project from the skin 20. These ends are fastened to the wings without freedom to turn: in this example, these ends are fluted for this purpose so as to provide reaction for moving the assembly. Naturally, other anti-turning elements could be used, such as keying or pinning. The skin 20 has chords or ribs together with plates 30 forming a load-carrying structure, and a covering that covers the load-carrying structure. The load-carrying structure has bearings such as ball bearings pivotally receiving the shaft of axis 21.

One actuator given overall reference 50 is mounted inside the skin 20 of the aileron 11 and two actuators 50 are mounted inside the skin 20 of the aileron 12.

Each actuator 50 comprises:
  a motor assembly 51 comprising a rotary electric motor with reduction gearing, that is mounted inside the skin 20 and that has an outlet shaft coupled to the shaft of axis 21, in this example by a gear train, so as to cause the skin 20 to turn about the axis 21;
  a power circuit 52 and a control circuit 53 for powering and controlling the electric motor 51; and sensors connected to the control circuit 53, in particular for detecting the angular position of the aileron relative to the axis 21.

In this example, the outlet shaft of the motor assembly 51 is colinear with the shaft of axis 21 with which it is constrained in rotation. The motor assembly 51 has one or more stators that are fastened to the load-carrying structure of the aileron in which it is incorporated. The motor assembly 51 need not have any reduction gearing, or on the contrary it may include such gearing (such transmission is referred to as "direct drive" or as "gear drive").

The circuits 52 and 53 are also housed inside the skin 20 and they are connected by electrical conductors to a connector leading to the outside of the skin 20. The connector 54 enables the circuits 52 and 53 to be powered electrically and enables the control circuits 53 to be connected to a flight control computer (not shown) of the aircraft that is in charge of the attitude of the aircraft. The flight control computer co-operates with the control circuit 53 to provide long-loop servo-control on the basis of position or homing setpoints that are used by the control circuit 53 to determine current setpoints. The control circuits 53 co-operate with the power circuit 52 to provide short-loop servo-control on the basis of the current setpoint used by the power circuit 52 for powering the coils of the motors 51. The power supply current determines the torque (force) that is generated electrically.

At least the power circuit 52 is secured to one of the plates 30. In this example, the plates 30 are made of a thermally conductive material and they are in contact with the skin 20. In this example, the control circuit 53 is also fastened on the plate 30. The stator(s) of the motor assembly 51 are also preferably fastened on the plate 30.

In this example, the plate 30 has bearings pivotally mounted on the shaft of axis 21, and the stator of the electric motor 51 is fastened to the plate 30.

The two actuators of the aileron 12 are synchronized so as to exert simultaneously the same forces on the shaft of axis 21. Advantageously, each actuator 50 of the aileron 12 is designed so as to be capable on its own of moving the aileron 12 so that, in the event of one of the actuators 50 failing, it is possible to continue controlling the aileron 12.

Arranging the actuator device inside the shell is advantageous, since the motor and the circuits thus no longer occupy space inside the structure of the aircraft. This makes it easier to install the flight control surface in the aircraft during a stage of assembly/construction, and it also facilitates subsequent maintenance operations. Ease of assembly is generally improved by the arrangement procured by the invention.

Each movable surface having two actuators 50 is provided with a device serving to prevent the motors of the actuators 50 exerting opposing forces on the skin of the flight control surface. In the absence of such a device, there is a risk that one of the motors might resist the force exerted by the other motor, e.g. because it is being controlled erroneously to operate in the opposite direction, or because the two motors have speeds or torques that are different as a result of a problem of calibrating or adjusting the motors relative to each other.

Figure 5:
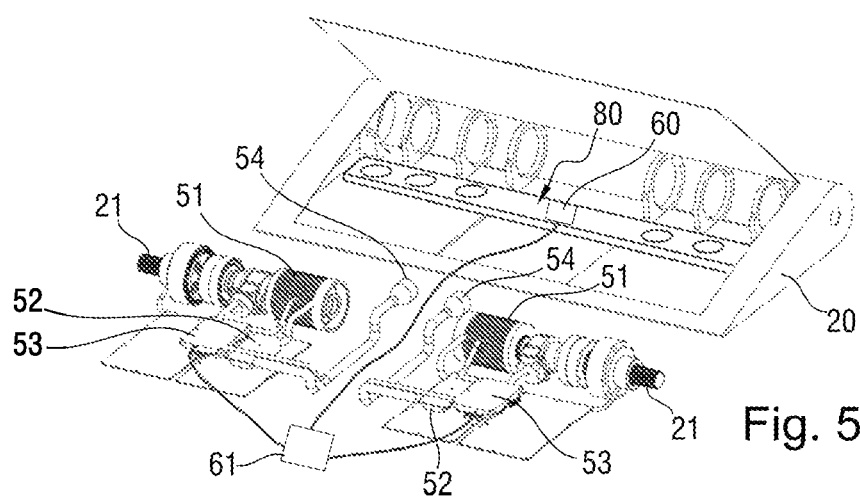
FIG. 5 is a view analogous to the view of FIG. 4 showing the second movable flight control surface provided with a device in a first embodiment for preventing opposing actions of the actuators.

With reference to FIG. 5, the aileron 12 is provided with such a device, which comprises strain gauges 60 that are fastened on a plate 80 having fastened thereon the stators of the motors and that is itself fastened to the skin 20. Thus, the strain gauges 60 are arranged in such a manner as to detect the stresses to which the plate 80 is subjected and which thus act on the skin 20 of the aileron 12.

The strain gauges 60 are connected to a detector circuit 61 that comprises a processor programmed to respond to the signals delivered by the strain gauges 60 to determine whether the motors of the actuators 50 are exerting forces of the same magnitude and in the same direction. The program is arranged to distinguish between the stresses to which the skin 20 is subjected and that result from aerodynamic thrust, and stresses that result from the forces exerted by the motors. The program is arranged to deduce the amplitude and the direction of a resultant of the opposing forces so as to be able to define correcting action to be taken by the motor control circuits as a function of that resultant.

The detector circuit 61 is connected to the motor control circuits 53 in order to provide them with correction data enabling the control circuit 53 to control the motors so that they exert the same force. The correction data is used by the control circuits 53 in order to act directly on the current feed servo-control loop setpoints for the coils of each motor. The value of the setpoints for one of the two motors is then reduced by command authority: the motor is put into a damper mode (the current setpoint is given a value close to zero), and then the current setpoint is increased, preferably progressively, until it reaches a value serving to balance the forces exerted by the two motors. It should be observed that rebalancing is performed directly on the short servo-control loop in order to obtain rebalancing as quickly as possible. The motor that is to have its current setpoint lowered is selected in this example by the computer program managing the commands from the flight control computer. The program selects the motor in question, e.g. as a function of a previously recorded history of current values (the motor that was the more heavily loaded until now is put into damper mode) or as a function of other information provided by a system for monitoring the statuses of the motors. The computer can act in real time to select which motor to put into damper mode, or that motor may be specified by an indication in memory (it might be always the same motor that is put into damper mode, or it might be one motor and then the other in alternation, . . . ). In a variant, the motor put into damper mode is the motor that is exerting the smaller force. This solution is particularly simple and fast.

Figure 6:
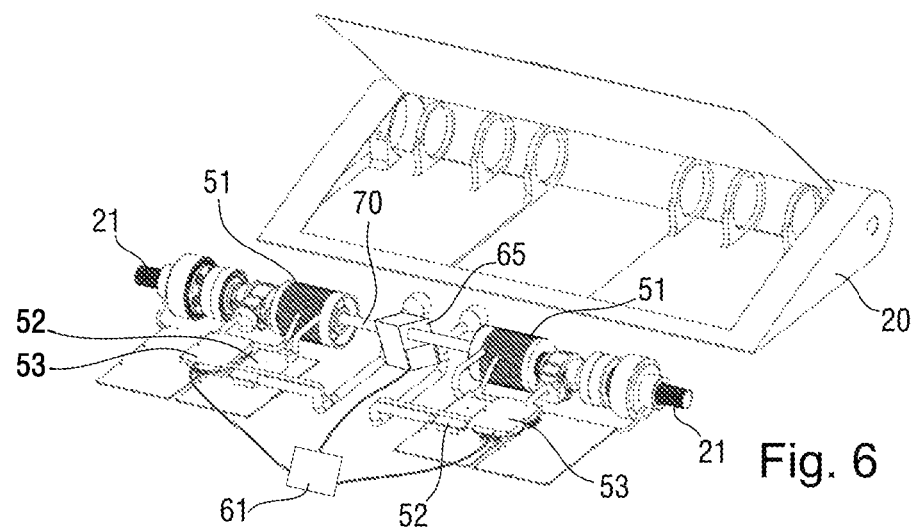
FIG. 6 is a view analogous to the view of FIG. 5, with an anti-opposition device in a second embodiment.

With reference to FIG. 6, the device comprises a strain-measuring member 65 having a bar 70 passing therethrough, which bar has one end constrained to rotate with the rotor of one of the motors and an opposite end constrained to rotate with the rotor of the other motor. The strain-measuring member 65 measures twisting stresses that result from any difference between the forces provided by the two motors. The strain-measuring member 65 could be replaced by strain gauges.

The strain-measuring member 65 is connected to a detector circuit 61 that has a processor programmed to respond to the signals from the strain gauges 60 to determine whether the motors of the actuators 50 are exerting forces of the same magnitude and in the same direction.

This arrangement has the advantage of requiring processing that is simpler since the bar 70 is less subjected to stresses resulting from the aerodynamic forces applied to the skin 20.

In addition, the stresses generated on the skin 20 by the opposing forces of the motors are limited by the presence of the bar 70.

Figure 7:
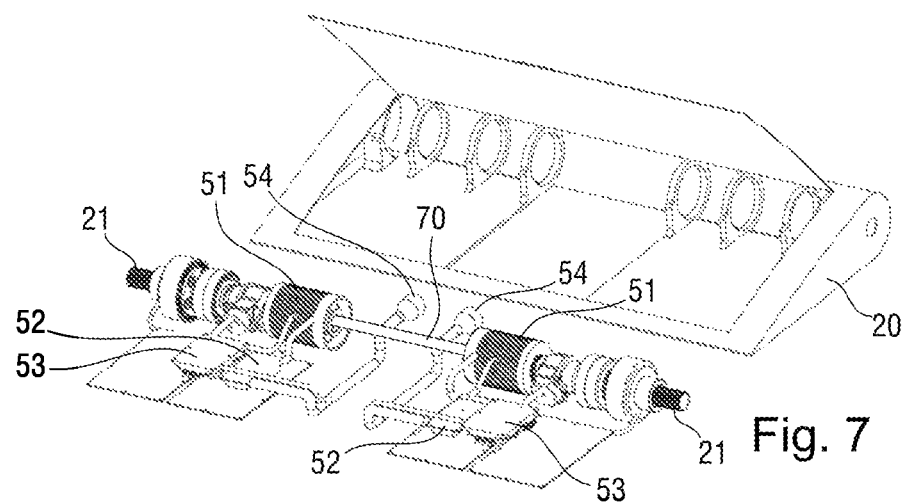
FIG. 7 is a view analogous to the view of FIG. 6 showing a basic variant of the second embodiment.

In a variant of this embodiment, and as shown in FIG. 7, the bar 70 does not have strain gauges.

It can be understood that when the motors are not controlled to have the same speed, the bar 70 transmits to the rotor of the faster motor the opposing force generated by the slower motor. The bar 70 then contributes to balancing the forces delivered to the movable surface by the motors. In addition, when the motors are controlled to operate in opposite directions with equivalent torque, the rotors of the motors cannot turn. This absence of movement is detected by the sensors connected to the control circuits 53 that are arranged to undertake corresponding corrective action.

This variant is more particularly adapted to motors that exert relatively low torque.

Naturally, the invention is not limited to the embodiments described but covers any variant coming within the ambit of the invention as defined by the claims.

In particular, the movable flight control surface may be of a structure that is different from that described.

The motor may be offset from the hinge axis 21 of the movable surface and it may be connected to the shaft of axis 21 by a mechanical transmission such as a gear train, a belt, . . . .

The shaft on the hinge axis and the outlet shaft of the motor may be a single piece, or they may be separate pieces. The outlet shaft of the motor may have ends projecting from both sides of the motor.

The motor may be linear.

The plates are optional, or only the motor need be fastened to a plate.

The movable surface may include some other number of motors.

The hinge shaft of the skin may comprise one or more portions.

The hinge shaft may have only one end projecting from the skin in order to form a "canard" type control surface.

The plate supporting the circuits may be distinct from the load-carrying structure of the aileron and it may be fitted onto the shaft or onto the chords of the movable surface.

The circuits may be mounted on one or more plates.

Also advantageously, the electrical connections between the surface and the airplane may be made either directly (via a connector on the outside of the surface) or via cables that pass inside one of the shafts for pivoting/fastening the surface to the airplane.

Also advantageously, the skin includes shielding to provide protection against electromagnetic disturbances. For example, the surface may be made of a carbon-based composite material (filled carbon, fiber mesh, etc.). Since the skin extends around the motor assembly and the electronic components, it forms shielding that contributes to the electromagnetic compatibility of the electronics and of the motor drive, and also to providing protection from the environment (e.g. against lightning).

According to an advantageous characteristic, the pivot shaft is hollow and at least one electric cable extends inside the pivot shaft and is connected to at least one of the circuits. Preferably, each of the two circuits is connected to a cable that extends inside the pivot shaft. The portions of the cables that extend between the movable surface and the remainder of the aircraft are subjected to flexing work during movements of the movable surface. Fastening the cables inside a hollow shaft avoids such flexing work and therefore limits fatigue in the cable.

There may be a single control circuit and/or a single power circuit common to the motors, or they may have separate control and/or power circuits.

In a variant, the control circuit is arranged to monitor operation of at least a portion of the movable surface. By way of example, such monitoring may be performed by comparing the values of electrical parameters of the power circuit with thresholds, and/or by tracking signal variation by means of at least one sensor, such as a temperature sensor, mounted on the motor. It is thus possible to perform monitoring of the status (or "health") of the motor drive for the movable surface.

The bar may be associated with a strain measuring device that is with or without contact.

The control circuit may be arranged so that the correcting action comprises reducing a current feed setpoint for one of the motors, and preferably that reduction in the current feed setpoint for one of the motors is followed by an increase in the current setpoint, at least for said motor, until the forces exerted by the motors are balanced.

The actuator device may be arranged on the structure of the aircraft.

The invention claimed is:

1. An electromechanical device for actuating a movable flight control surface having a skin hinged to a structure of an aircraft about a pivot axis, the device comprising:
   at least two electric motors for causing the skin to pivot about the pivot axis;
   a power circuit and a control circuit for powering and controlling each of the at least two motors; and
   a device for limiting opposing forces exerted by the at least two electric motors that includes a detector circuit arranged to determine an amplitude and a direction of a resultant of opposing forces so as to enable the control circuits to take correcting action as a function of the resultant.

2. The device according to claim 1, wherein the detector circuit is connected to strain gauges, and from the signals from the strain gauges it deduces the amplitude and the direction of the resultant of the opposing forces.

3. The device according to claim 2, wherein the strain gauges are fastened on a plate having the stators of the motors fastened thereto.

4. The device according to claim 1, wherein the control circuit is arranged so that the corrective action comprises reducing a current feed setpoint for one of the motors.

5. The device according to claim 4, wherein reduction of the current feed setpoint for one of the motors is followed by increasing the current setpoint, at least for said motor, until the forces exerted by the motors are balanced.

6. The device according to claim 1, wherein the detector circuit is connected to the control circuits in order to provide the control circuits with correction data enabling the control circuits to control the at least two electric motors so that the at least two electric motors exert the same force, the correction data being used by the control circuits in order to act directly on the current feed servo-control loop setpoints for coils of each of the at least two electric motors.

7. The device according to claim 1, wherein a motor that is to have its current setpoint lowered is selected by a computer program managing commands from a flight control computer, said program selecting the motor that is to have its current setpoint lowered as a function of:
   a previously recorded history of current values; or
   other information provided by a system for monitoring the statuses of the at least two electric motors; or
   an indication in memory; or
   a force exerted by the motor.

* * * * *